United States Patent
Matsunaga et al.

(10) Patent No.: US 12,515,673 B2
(45) Date of Patent: Jan. 6, 2026

(54) MOBILE OBJECT CONTROL DEVICE AND MOBILE OBJECT CONTROL METHOD

(71) Applicant: HONDA MOTOR CO., LTD., Tokyo (JP)

(72) Inventors: Hideki Matsunaga, Wako (JP); Yuji Yasui, Wako (JP); Takashi Matsumoto, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 368 days.

(21) Appl. No.: 17/702,830

(22) Filed: Mar. 24, 2022

(65) Prior Publication Data

US 2022/0315006 A1    Oct. 6, 2022

(30) Foreign Application Priority Data

Mar. 30, 2021    (JP) ................................. 2021-056991

(51) Int. Cl.
*B60W 40/06*    (2012.01)
*B60W 30/14*    (2006.01)
(Continued)

(52) U.S. Cl.
CPC .......... *B60W 40/06* (2013.01); *B60W 30/146* (2013.01); *B60W 40/08* (2013.01);
(Continued)

(58) Field of Classification Search
CPC .... B60W 40/06; B60W 30/146; B60W 40/08; B60W 50/10; B60W 50/14;
(Continued)

(56) References Cited

U.S. PATENT DOCUMENTS 10,915,762 B1 *   2/2021   Russell ..................... G06T 7/20
2001/0053956 A1  12/2001   Ohishi et al.
(Continued)

FOREIGN PATENT DOCUMENTS

CN    109774729    5/2019
CN    111655135    9/2020
(Continued)

OTHER PUBLICATIONS

Japanese Office Action for Japanese Patent Application No. 2021-056991 mailed May 21, 2024.
(Continued)

*Primary Examiner* — Anne Marie Antonucci
*Assistant Examiner* — Patrick Daniel Mohl
(74) *Attorney, Agent, or Firm* — Amin, Turocy & Watson, LLP

(57) ABSTRACT

A hardware processor of a mobile object executes the program stored in a storage device to acquire a state of at least one occupant getting on a mobile object capable of moving on both a roadway and a predetermined region different from the roadway; to recognize whether the mobile object is moving on the roadway or the predetermined region; to recognize presence of a contact portion between the predetermined region and the roadway in a traveling direction of the mobile object; to control the speed of the mobile object at least partially, and limit a speed at which the mobile object is moving on the roadway to a first speed and limit a speed at which the mobile object is moving on the predetermined region to a second speed slower than the first speed; and to bring a speed of the mobile object closer to the second speed when the mobile object is moving on the roadway, the contact portion is recognized within a predetermined range from the mobile object, and the state of the occupant is a predetermined state.

14 Claims, 5 Drawing Sheets

(51) Int. Cl.
  *B60W 40/08* (2012.01)
  *B60W 50/10* (2012.01)
  *B60W 50/14* (2020.01)

(52) U.S. Cl.
  CPC ............ *B60W 50/10* (2013.01); *B60W 50/14* (2013.01); *B60W 2040/089* (2013.01)

(58) Field of Classification Search
  CPC ....... B60W 2040/089; B60W 2540/21; B60W 2540/225; B60W 2720/10; B60W 60/0053; B60W 30/09; B60W 60/005; B60W 60/0059
  See application file for complete search history.

(56) References Cited

U.S. PATENT DOCUMENTS

| | | | |
|---|---|---|---|
| 2017/0116485 A1* | 4/2017 | Mullen | G08G 1/09626 |
| 2019/0008437 A1* | 1/2019 | Ben-Ezra | G06V 10/803 |
| 2019/0143989 A1 | 5/2019 | Oba | |
| 2019/0144000 A1* | 5/2019 | Hennes | G05D 1/0278 701/23 |
| 2019/0310091 A1 | 10/2019 | Maeda et al. | |
| 2020/0223444 A1* | 7/2020 | Bonanni | G06V 20/597 |
| 2020/0283022 A1 | 9/2020 | Hara et al. | |
| 2020/0383580 A1* | 12/2020 | Shouldice | A61B 5/0205 |
| 2021/0034156 A1* | 2/2021 | Drayna | G06F 3/017 |
| 2021/0064030 A1* | 3/2021 | Jiang | B60W 60/001 |
| 2021/0188225 A1* | 6/2021 | Van Hoecke | H04W 4/023 |
| 2021/0229672 A1* | 7/2021 | Herman | G06T 3/4015 |
| 2021/0237766 A1* | 8/2021 | Suzuki | B60W 60/001 |
| 2021/0357177 A1* | 11/2021 | Heo | G06F 3/167 |
| 2022/0036747 A1* | 2/2022 | Ortman | G05D 1/106 |
| 2022/0222473 A1* | 7/2022 | Nakagawa | G06F 16/55 |
| 2022/0289248 A1* | 9/2022 | Niewiadomski | G06N 20/00 |
| 2023/0121146 A1* | 4/2023 | Yamamoto | G06T 7/11 340/944 |
| 2023/0375347 A1* | 11/2023 | Nimura | B60W 40/06 |

FOREIGN PATENT DOCUMENTS

| | | |
|---|---|---|
| CN | 111665834 | 9/2020 |
| CN | 112141124 | 12/2020 |
| EP | 2045178 | 4/2009 |
| JP | 2001-289661 | 10/2001 |
| JP | 2005-289213 | 10/2005 |
| JP | 2006-168593 | 6/2006 |
| JP | 2009-089758 | 4/2009 |
| JP | 2014-157467 | 8/2014 |
| JP | 2016-212120 | 12/2016 |
| JP | 2017-100490 | 6/2017 |
| JP | 2018-136169 | 8/2018 |
| JP | 2020-027459 | 2/2020 |
| JP | 2020-095389 | 6/2020 |
| JP | 2020-121573 | 8/2020 |
| JP | 2020-185889 | 11/2020 |
| JP | 2020-189536 | 11/2020 |
| JP | 2021-046031 | 3/2021 |
| WO | 2017/195405 | 11/2017 |
| WO | 2018/134863 | 7/2018 |
| WO | 2019/122414 | 6/2019 |

OTHER PUBLICATIONS

Japanese Office Action for Japanese Patent Application No. 2024-182000 mailed Jun. 24, 2025.
Chinese Office Action for Chinese Patent Application No. 202210154462.3 mailed Jul. 28, 2025.

* cited by examiner

MOBILE OBJECT CONTROL DEVICE AND MOBILE OBJECT CONTROL METHOD

CROSS-REFERENCE TO RELATED APPLICATION

Priority is claimed on Japanese Patent Application No. 2021-056991, filed Mar. 30, 2021, the content of which is incorporated herein by reference.

BACKGROUND

Field of the Invention

The present invention relates to a mobile object control device and a mobile object control method.

Description of Related Art

In the related art, the invention of a one-person riding electromotive vehicle capable of moving on a sidewalk has been disclosed (see Japanese Unexamined Patent Application, First Publication No. 2020-189536).

SUMMARY

Technologies of the related art have not taken into account mobile objects capable of moving on both roadways and predetermined regions different from roadways. Therefore, appropriate control cannot be performed at the time of entrance to predetermined regions from roadways in some cases.

The present invention is devised in view of such circumstances and an objective of the present invention is to provide a mobile object control device and a mobile object control method capable of appropriately controlling a mobile object capable of moving on both a roadway and a predetermined region different from the roadway at the time of entrance to a predetermined region from a roadway.

A driving support device, a mobile object control device and a mobile object control method according to the present invention adopt the following configurations.

(1) According to an aspect of the present invention, a mobile object control device includes a storage device storing a program and a hardware processor. The hardware processor executes the program stored in the storage device to: acquire a state of at least one occupant getting on a mobile object capable of moving on both a roadway and a predetermined region different from the roadway; recognize whether the mobile object is moving on the roadway or the predetermined region; recognize presence of a contact portion between the predetermined region and the roadway in a traveling direction of the mobile object; control the speed of the mobile object at least partially, and limit a speed at which the mobile object is moving on the roadway to a first speed and limit a speed at which the mobile object is moving on the predetermined region to a second speed slower than the first speed; and bring a speed of the mobile object closer to the second speed when the mobile object is moving on the roadway, the contact portion is recognized within a predetermined range from the mobile object, and the state of the occupant is a predetermined state.

(2) In the mobile object control device according to the aspect (1), the hardware processor may question about an intention to enter the predetermined region using an interface device when the mobile object is moving on the roadway, the contact portion is recognized within a predetermined range from the mobile object, and the state of the occupant is the predetermined state, and a speed of the mobile object may be brought closer to the second speed when a positive response is obtained.

(3) In the mobile object control device according to the aspect (1), the hardware processor may acquire a direction of a visual line of the occupant as a state of the occupant. The predetermined state may be a state in which the direction of the visual line of the occupant is oriented in a direction of the predetermined region.

(4) In the mobile object control device according to the aspect (1), the hardware processor may acquire a direction of a visual line of the occupant as a state of the occupant. The predetermined state may be a state in which the direction of the visual line of the occupant is unstable.

(5) In the mobile object control device according to the aspect (1), the hardware processor may acquire content of a conversation with the occupant spoken using an interface device. The predetermined state may be a state in which a specific keyword is included in the content of the conversation.

(6) In the mobile object control device according to the aspect (5), the specific keyword may be related to a meal or hunger.

(7) In the mobile object control device according to the aspect (5), the specific keyword may be related to a rest or fatigue.

(8) In the mobile object control device according to the aspect (1), the hardware processor may recognize whether the mobile object is moving on the roadway or the predetermined region based on an output of an outside world detection device detecting an outside situation of the mobile object.

(9) In the mobile object control device according to the aspect (1), the hardware processor may recognize whether the mobile object is moving on the roadway or the predetermined region based on a manipulation of the occupant on a switch provided inside the mobile object.

(10) In the mobile object control device according to the aspect (1), when the hardware processor recognizes that the mobile object is moving on the predetermined region, the hardware processor may cause an external report device to report the mobile object which is moving on the predetermined region to the outside of the mobile object.

(11) According to another aspect of the present invention, a mobile object control method is performed by a computer controlling a mobile object on which at least one occupant gets and which is capable of moving both on a roadway and a predetermined region different from the roadway. The method includes: acquiring a state of the occupant; recognizing whether the mobile object is moving on the roadway or the predetermined region; recognizing presence of a contact portion between the predetermined region and the roadway in a traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and bringing a speed of the mobile object closer to the second speed when the mobile object is moving on the roadway, the contact portion is recognized within a predetermined range from the mobile object, and the state of the occupant is a predetermined state.

(12) According to another aspect of the present invention, a mobile object control device includes a storage device storing a program and a hardware processor. The hardware processor executes the program stored in the storage device to: acquire a state of at least one occupant getting on a mobile object capable of moving on both a roadway and a predetermined region different from the roadway; recognize whether the mobile object is moving on the roadway or the predetermined region; recognize presence of a contact portion between the predetermined region and the roadway in a traveling direction of the mobile object; control the speed of the mobile object at least partially, and limit a speed at which the mobile object is moving on the roadway to a first speed and limit a speed at which the mobile object is moving on the predetermined region to a second speed slower than the first speed; and suggest deceleration to the occupant using an interface device when the mobile object is moving on the roadway, the contact portion is recognized within a predetermined range from the mobile object, and the state of the occupant is a predetermined state.

(13) According to another aspect of the present invention, a mobile object control method is performed by a computer controlling a mobile object on which at least one occupant gets and which is capable of moving both on a roadway and a predetermined region different from the roadway. The method includes: acquiring a state of the occupant; recognizing whether the mobile object is moving on the roadway or the predetermined region; recognizing presence of a contact portion between the predetermined region and the roadway in a traveling direction of the mobile object; controlling the speed of the mobile object at least partially; limiting a speed at which the mobile object is moving on the roadway to a first speed; limiting a speed at which the mobile object is moving on the predetermined region to a second speed slower than the first speed; and suggesting deceleration to the occupant using an interface device when the mobile object is moving on the roadway, the contact portion is recognized within a predetermined range from the mobile object, and the state of the occupant is a predetermined state.

According to the aspects (1) to (13), it is possible to appropriately control a mobile object capable of moving on both a roadway and a predetermined region different from the roadway at the time of entrance to a predetermined region from a roadway.

DETAILED DESCRIPTION

Hereinafter, an embodiment of a mobile object control device, a mobile object control method, and a storage medium according to the present invention will be described with reference to the drawings. A mobile object moves on both a roadway and a predetermined region different from the roadway. The predetermined region is, for example, a sidewalk. The predetermined region may be some or all of a roadside strip, a bicycle lane, a public open space, and the like or may include all of a sidewalk, a roadside strip, a bicycle lane, and a public open space. In the following description, the predetermined region is assumed to be a sidewalk. In the following description, a portion described as a "sidewalk" can be appropriately replaced with the "predetermined region."

First Embodiment

Figure 1:
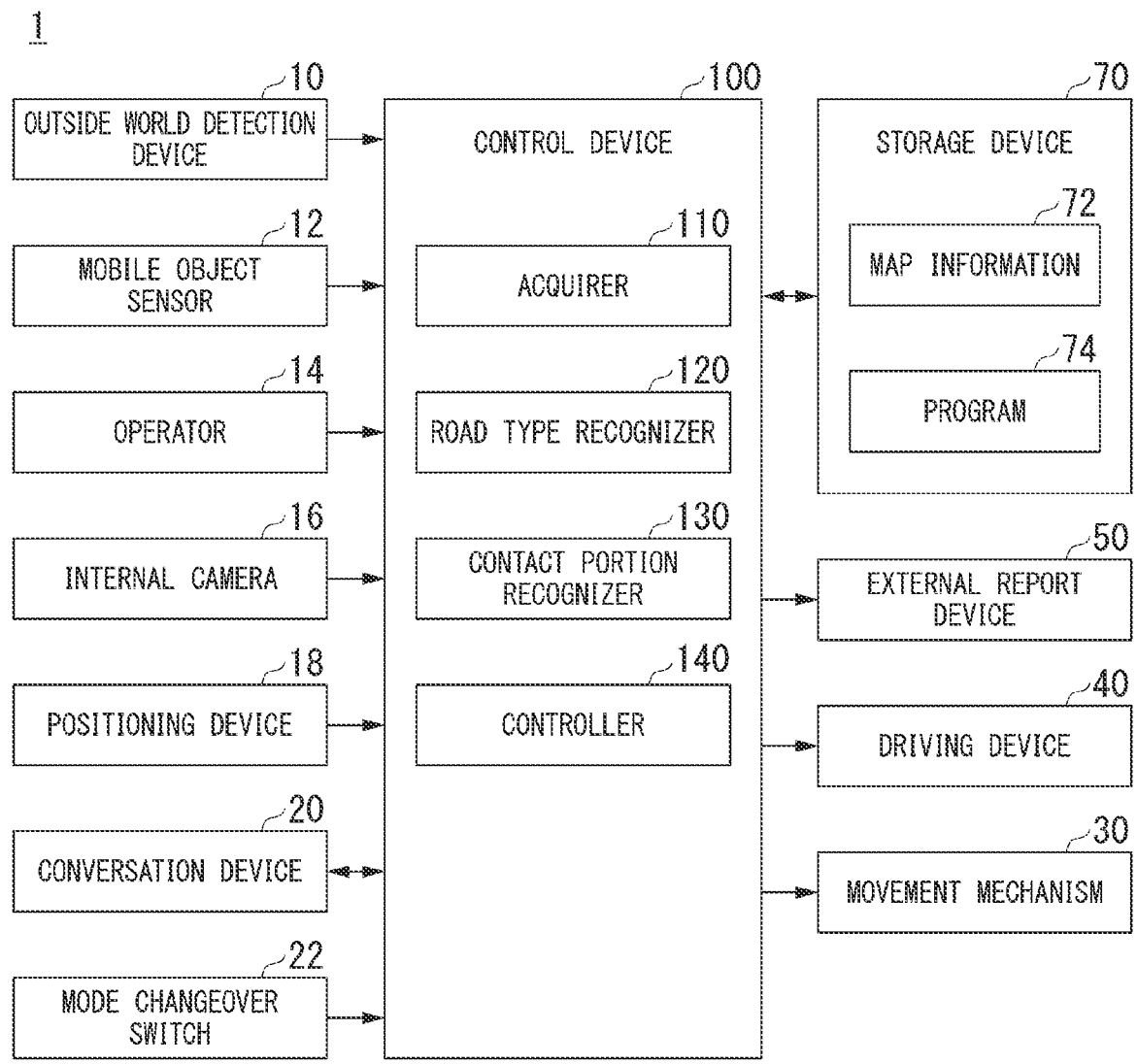
FIG. 1 is a diagram illustrating an exemplary configuration of a mobile object and a control device according to an embodiment.

FIG. 1 is a diagram illustrating an exemplary configuration of a mobile object 1 and a control device 100 according to an embodiment. In the mobile object 1, for example, an outside world detection device 10, a mobile object sensor 12, an operator 14, an internal camera 16, a positioning device 18, a conversation device 20, a mode changeover switch 22, a movement mechanism 30, a driving device 40, an external report device 50, a storage device 70, and a control device 100 are mounted. Of these constituents, some of the constituents unnecessary to implement functions of the present invention may be omitted.

The outside world detection device 10 is any of various devices in which a traveling direction of the mobile object 1 is a detection range. The outside world detection device 10 includes an external camera, a radar device, a light detection and ranging (LIDAR) device, and a sensor fusion device. The outside world detection device 10 outputs information (an image, a position of an object, or the like) indicating a detection result to the control device 100.

The mobile object sensor 12 includes, for example, a speed sensor, an acceleration sensor, a yaw rate (angular velocity) sensor, an azimuth sensor, and a manipulation amount detection sensor or the like mounted on the operator 14. The operator 14 includes, for example, an operator (for example, an accelerator pedal or a brake pedal) for giving an instruction for an acceleration or deceleration speed and an operator (for example, a steering wheel) for giving an instruction for steering. In this case, the mobile object sensor 12 may include an accelerator opening sensor, a brake step sensor, and a steering torque sensor. The mobile object 1 may include an operator (for example, a rotational operator with no annular shape, a joystick, a button, or the like) other than the above sensor as the operator 14.

The internal camera 16 images at least the head of an occupant of the mobile object 1 in front. The internal camera 16 is a digital camera using an image sensor such as a charge coupled device (CCD) camera or a complementary metal oxide semiconductor (CMOS) camera. The internal camera 16 outputs captured images to the control device 100.

The positioning device 18 is a device that locates a position of the mobile object 1. The positioning device 18 is for example, global navigation satellite system (GNSS) receiver, identifies a position of the mobile object 1 based on signals received from GNSS satellites, and outputs the position as positional information. The positional information of the mobile object 1 may be estimated from a position of a Wi-Fi base station to which a communication device to be described below is connected.

The conversation device 20 includes, for example, a speaker, a microphone, a touch panel, and a communication device. The conversation device 20 appropriately processes a vocal sound of an occupant corrected by a microphone, transmits the processed vocal sound to a server device using a communication device via a network, and supplies information regarding the vocal sound from a speaker based on information replied from the server device. The conversation device 20 is also called an agent device, a concierge device, an assistance device, or the like in some cases. The server device has a sound recognition function, a natural language processing function, a meaning interpretation function, a reply content determination function, and the like. The conversation device 20 may transmit the positional information to the server device and the server device may reply with the positional information and information of facility corresponding to a guidance request (for example, "Where is a delicious noodle shop nearby?") coming from an occupant. In this case, a sound guidance such as "If you turn left ahead, it is there" is performed by the conversation device 20. The present invention is not limited thereto. The conversation device 20 has a function of receiving a natural speech from an occupant and returning an appropriate reply. The conversation device 20 may have a function of performing a simple conversation without involvement with the server device, such as a function of asking a question from a device side and receiving a reply, and thus may question an occupant in response to a request from the control device 100. The conversation device 20 is an example of an interface device.

The mode changeover switch 22 is a switch manipulated by an occupant. The mode changeover switch 22 may be a mechanical switch or may be a graphical user interface (GUI) switch set on a touch panel. The mode changeover switch 22 receives a manipulation of switching a driving mode to any one of, for example, mode A which is a speed assistance mode in which a steering manipulation is performed by an occupant and acceleration or deceleration speed control is automatically performed: mode B which is a manual driving mode in which a steering manipulation and an acceleration or deceleration speed manipulation are performed by an occupant, and mode C which is an automated driving mode in which manipulation control and acceleration or deceleration speed control are automatically performed.

The movement mechanism 30 is a mechanism that moves the mobile object 1 on a road. The movement mechanism 30 is, for example, a wheel group including a steering wheel and driving wheel. The movement mechanism 30 may be each section for multiped walking.

The driving device 40 outputs a force to the movement mechanism 30 to move the mobile object 1. For example, the driving device 40 includes a motor driving the driving wheel, a battery storing power to be supplied to the motor, and a steering device that adjust a steering angle of the steering wheel. The driving device 40 may include an internal combustion engine or a fuel cell as a driving power output unit or a power generation unit. The driving device 40 may further include a brake device operating with a frictional force or air resistance.

The external report device 50 is provided in an external plate unit of the mobile object 1 and is, for example, a lamp, a display device, a speaker, or the like for reporting information to the outside of the mobile object 1. The external report device 50 performs different operations between a state in which the mobile object 1 is moving on a sidewalk and a state in which the mobile object 1 is moving on a roadway. For example, the external report device 50 performs control such that a lamp is caused to emit light when the mobile object 1 is moving on a sidewalk, and the lamp is caused not to emit light when the mobile object 1 is moving on a roadway. The color of the light emitted from the lamp may be appropriate color determined by laws. When the external report device 50 is a display device, the external report device 50 displays an indication of "traveling on a sidewalk" in text or a graph in a case in which the mobile object 1 is traveling on a sidewalk.

Figure 2:
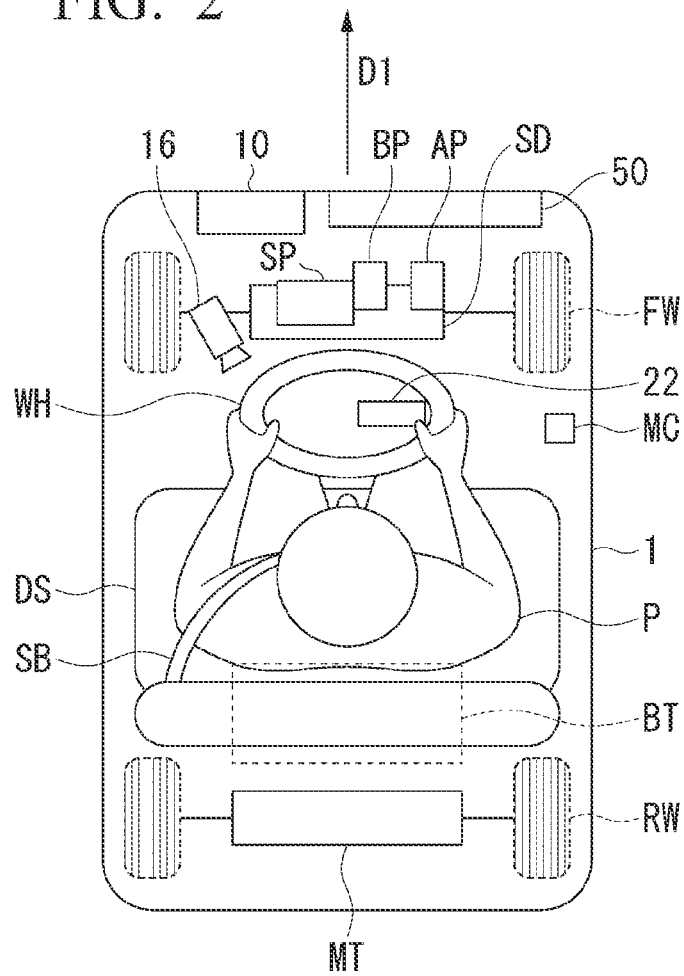
FIG. 2 is a perspective view illustrating the mobile object when viewed from the upper side.

FIG. 2 is a perspective view illustrating the mobile object 1 when viewed from the upper side. In the drawing, FW denotes a steering wheel, RW denotes a driving wheel, SD is a steering device, MT denotes a motor, and BT denotes a battery. AP denotes an accelerator pedal, BP denotes a brake pedal, WH denotes a steering wheel, SP denotes a speaker, and MC denotes a microphone. The illustrated mobile object 1 is a one-person riding mobile object and an occupant P sits on a driving seat DS and a seat belt SB is fastened. An arrow D1 indicates a traveling direction (a velocity vector) of the mobile object 1. The outside world detection device 10 is provided near a front edge of the mobile object 1, the internal camera 16 is provided at a position at which the head of the occupant P can be imaged from the front of the occupant P, and the mode changeover switch 22 is provided in each of a boss section of the steering wheel WH. The external report device 50 is provided as a display device near a front edge of the mobile object 1.

Referring back to FIG. 1, the storage device 70 is, for example, a non-transitory storage device such as a hard disk drive (HDD), a flash memory, or a random access memory (RAM). The storage device 70 stores map information 72, a program 74 which is executed by the control device 100, and the like. In the drawing, the storage device 70 is illustrated outside of a range of the control device 100, but the storage device 70 may be included in the control device 100.

Control Device

The control device 100 includes, for example, an acquirer 110, a road type recognizer 120, a contact portion recognizer 130, and a controller 140. For example, a hardware processor such as a central processing unit (CPU) executes the program (software) 74 for implementation. Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in the storage device 70 or may be stored in a detachably mounted storage medium such as a DVD or a CD-ROM so that the storage medium (a non-transitory storage medium) is mounted on a drive device to be installed on the storage device 70.

The acquirer 110 acquires a state of the occupant P. The state of the occupant P is, for example, a direction of a visual line of the occupant P, content (in particular, whether there is a specific keyword) of conversation between the occupant P and the conversation device 20.

The acquirer 110 recognizes and acquires a direction of a visual line of the occupant P by analyzing an image captured by the internal camera 16. For example, the acquirer 110 recognizes the direction of the visual line of the occupant P based on a positional relation between an inner corner and an iris. The acquirer 110 may recognize the direction of the visual line of the occupant P using a near infrared light source or a corneal reflex.

For example, when text information obtained as a result of sound recognition in the server device or sound output by the conversation device 20 includes a specific keyword, the conversation device 20 is configured in advance to output information regarding the keyword to the acquirer 110. The acquirer 110 acquires the information regarding the specific keyword from the conversation device 20. The specific keyword is for example, a keyword related to a meal or hunger and is specifically "restaurant," "meal," "I'm hungry," "bowl of rise topped with beef." The specific keyword may be a keyword related to a rest or fatigue. Specifically, the specific keyword is "tired," "convenience store," "vending machine," "slowly (a meaning indicating slow movement due to being tired is supposed)."

The road type recognizer 120 recognizes whether the mobile object 1 is moving on a roadway or a sidewalk. The road type recognizer 120 recognizes whether the mobile object 1 is moving on a roadway or a sidewalk, for example, by analyzing an image captured by an external camera of the outside world detection device 10. An example of image analysis includes semantic segmentation. The road type recognizer 120 classifies pixels of a frame of an image into classes (roadways, sidewalks, boundaries, obstacles, and the like) and performs labeling, recognizes that the mobile object 1 is moving on a roadway when the number of pixels labeled as a roadway in a region equivalent to a front face of the mobile object 1 is large, and recognizes that the mobile object 1 is moving on a sidewalk when the number of pixels in which a label of the sidewalk is granted to a region equivalent to the front face of the mobile object 1 is large in the image. The present invention is not limited thereto. When the road type recognizer 120 recognizes a vehicle in a region equivalent to the front face of the mobile object 1 in the image, the road type recognizer 120 may recognize that the mobile object 1 is moving in the roadway. When the road type recognizer 120 recognizes a pedestrian in a region equivalent to the front face of the mobile object 1 in the image, the road type recognizer 120 may recognize that the mobile object 1 is moving on the sidewalk. When the width of a road surface region which is in the region equivalent to the front face of the mobile object 1 in the image is large, the road type recognizer 120 may recognize that the mobile object 1 is moving on the roadway. When the width of the road surface region which is in the region equivalent to the front face of the mobile object 1 in the image is small, the road type recognizer 120 may recognize that the mobile object 1 is moving on the sidewalk. The road type recognizer 120 may combine positional information of the mobile object 1 and the map information 72 and recognize whether the mobile object 1 is moving on a roadway or a sidewalk. In this case, it is necessary for the map information to have accuracy to the degree that the roadway and the sidewalk can be distinguished from each other from positional coordinates. When there is no "predetermined region" in a sidewalk, the road type recognizer 120 performs a similar process on a roadside strip, a bicycle lane, a public open space, or the like.

Figure 3:
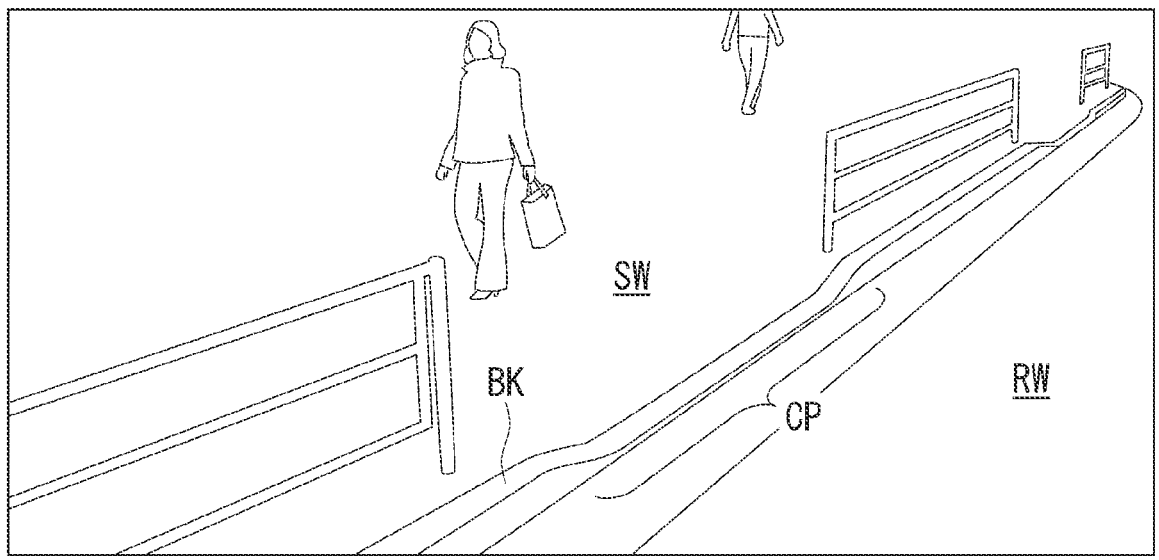
FIG. 3 is a diagram illustrating an exemplary shape of a contact portion.
Figure 4:
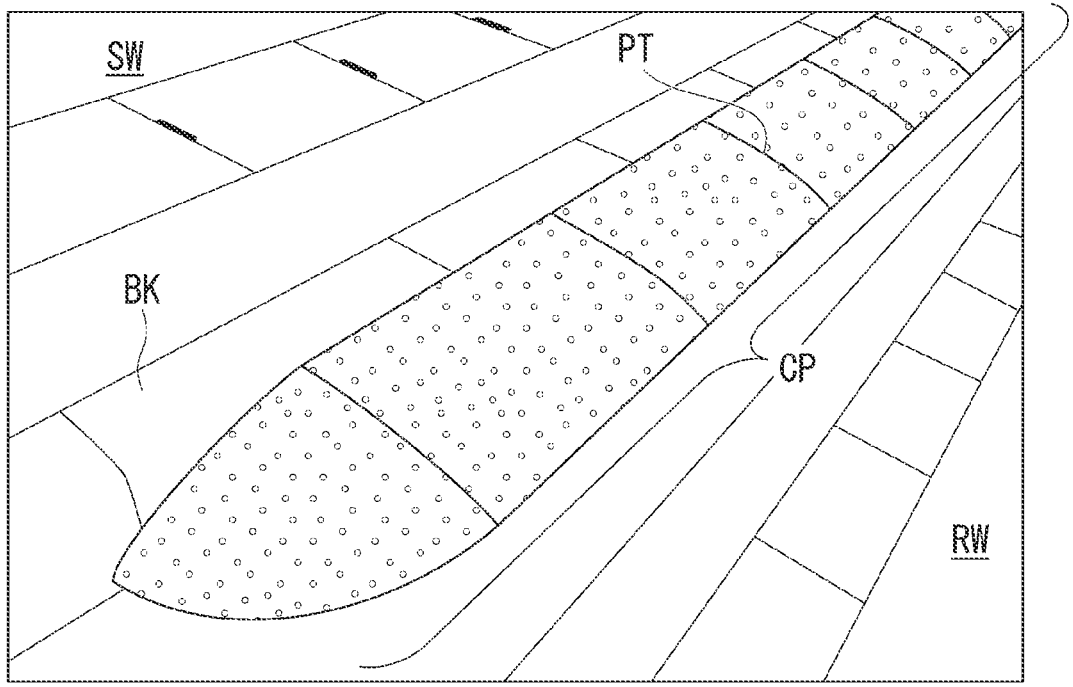
FIG. 4 is a diagram illustrating an exemplary shape of the contact portion.
Figure 5:
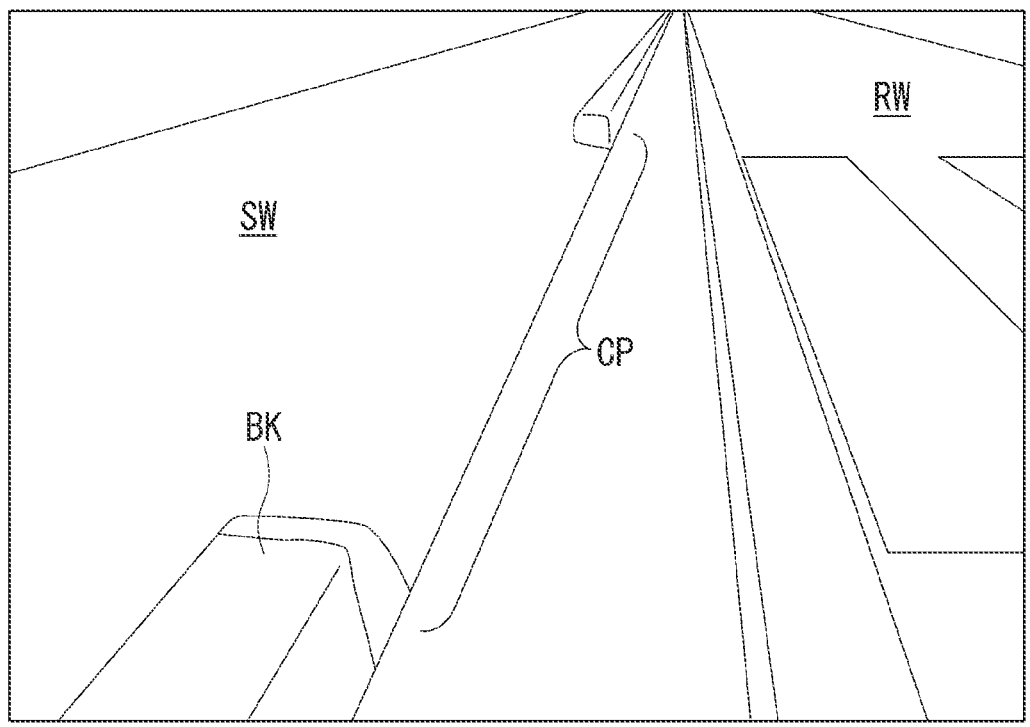
FIG. 5 is a diagram illustrating an exemplary shape of the contact portion.

The contact portion recognizer 130 recognizes presence of a contact portion between a sidewalk and a roadway in a traveling direction of the mobile object. The contact portion is provided at a boundary between a sidewalk and a roadway and is a portion in which a load is less than in other portions of the boundary when the mobile object passes through. For example, when there is a step difference in the boundary between the sidewalk and the roadway, a portion (including a portion in which the sidewalk is flush with the roadway) in which the step difference is alleviated. FIGS. 3 to 5 are diagrams illustrating an exemplary shape of a contact portion. As illustrated in FIG. 3, the contact portion CP is, for example, a portion in which a block BK of the boundary is lowered together with a sidewalk SW. In the drawing, RW denotes a roadway. As illustrated in FIG. 4, the contact portion CP may be a portion in which a step difference canceling plate PT with which the step difference between the roadway RW and the sidewalk SW is buried is placed. As illustrated in FIG. 5, the contact portion CP may be a portion in which the block BK where there is a step difference between the roadway RW and the sidewalk SW is missing. Apart from these exemplified shapes, the contact portion CP with any of various shapes is assumed. The contact portion CP may be present not only in a portion along the way of a road but also in an intersection or the like. For example, when an image is input, the contact portion recognizer 130 recognizes presence of the contact portion CP by inputting an image captured by an external camera to a learned model that is learned so that information indicating a position of the contact portion CP is output. The contact portion recognizer 130 may recognize presence of the contact portion CP based on the shape of a step difference obtained as a result by performing scanning obliquely downward with an LIDAR.

For example, the controller 140 controls the driving device 40 in accordance with a set driving mode.

In mode A, the controller 140 controls the driving device 40 such that a distance from an object in front of the mobile object 1 is kept to be a constant value or more when the mobile object 1 is moving on a roadway, and the mobile object 1 is moving at a first speed V1 (for example, a speed equal to or greater than 10 [km/h] and less than tens of [km/h]) when the distance from the object in front of the mobile object 1 is sufficiently long. The controller 140 controls the driving device 40 such that the distance from the object in front of the mobile object 1 is kept to be a constant value or more when the mobile object 1 is moving on a sidewalk, and the mobile object 1 is moving at a second speed V2 (for example, a speed less than 10 [km/h]) when the distant to the object in front of the mobile object 1 is sufficiently long. This function is similar to an adaptive cruise control (ACC) function of a vehicle moving at a speed set as the first speed V1 or the second speed V2 and a technology used for ACC can be used. In mode A, the controller 140 controls a steering angle of a steering wheel based on a manipulation amount of the operator 14 such as a steering wheel. This function is a similar to a function of a power steering device and a technology used for a power steering device can be used. Without performing electronic control on steering, the mobile object 1 may include a steering device to which the operator 14 and the steering mechanism are mechanically connected.

In mode B, the controller 140 controls the driving device 40 based on a speed of the mobile object 1 and a manipulation amount of an accelerator pedal or a brake pedal. The controller 140 controls the driving device 40 such that the first speed V1 is set an upper limit of the speed when the mobile object 1 is moving on a roadway (in the case of mode B, a case in which the speed reaches an upper limit of the speed means that the mobile object 1 cannot be accelerated even if an instruction for further acceleration is given). The controller 140 controls the driving device 40 such that the second speed V2 is set as the upper limit of the speed when the mobile object 1 is moving on a sidewalk. Steering is similar to that of mode A.

In mode C, the controller 140 controls the driving device 40 such that a course and obstacles are detected based on an output of the outside world detection device 10, a target trajectory along which the mobile object 1 can move while avoiding obstacles in the course is generated, and the mobile object 1 moves along the target trajectory. Even in mode C, the controller 140 controls the driving device 40 such that the first speed V1 is set as the upper limit of the speed when the mobile object 1 is moving on a roadway. The controller 140 controls the driving device 40 such that the second speed V2 is set as the upper limit of the speed when the mobile object 1 is moving on a sidewalk. Since mode C is not a core of the present invention, more detailed description will be omitted.

Control in Accordance with Presence of Contact Portion

Hereinafter, control in accordance with presence of a contact portion by the controller 140 will be described in order from mode A. In mode A, the controller 140 brings a speed of the mobile object 1 closer to the second speed V2 from the first speed V1 when the mobile object 1 is moving on a roadway, a contact portion is recognized within a predetermined range from the mobile object 1, and a state of an occupant is a predetermined state. "Bringing of the speed of the mobile object 1 closer to the second speed V2 from the first speed V1" means deceleration of the mobile object 1 except for a case in which the mobile object 1 is moving at a low speed or stops in accordance with presence of an unexpected obstacle. At this time, the controller 140 may ask a question about an intention to enter a sidewalk using the conversation device 20, may bring the speed of the mobile object 1 closer to the second speed V2 when a positive reply is obtained, and may not bring the speed of the mobile object 1 closer to the second speed V2 when a positive reply is not obtained. Hereinafter, irrespective of whether there is a question, "bringing of the speed of the mobile object 1 closer to the second speed V2 from the first speed V1 when the mobile object 1 is moving on a roadway, a contact portion is recognized within a predetermined range from the mobile object 1, and a state of an occupant is a predetermined state" is referred to as "specific speed control."

The "predetermined state" refers to, for example, some or all of the following events. Information serving as a reference for determining whether the state of the occupant is the predetermined state is acquired by the acquirer 110 and is delivered to the controller 140, as described above.

(A) The predetermined state is, for example, a state in which a direction of a visual line of an occupant is oriented in a direction of a sidewalk. The "orientation in the direction of the sidewalk" can be said that a state in which a direction in which the direction of the visual line of the occupant is projected to a horizontal plane is further inclined to the sidewalk side by a first angle or more than a traveling direction of the mobile object 1 (an extension direction of a road may be used instead of this) continues for a first reference time or more.

(B) The predetermined state is, for example, a state in which a direction of a visual line of an occupant is unstable. The "unstable state" is, for example, a state in which the direction of the visual line of the occupant at each sampling time is changed at a second angle or more a predetermined number of times or more within a second reference time compared to a direction of the past.

(C) The predetermined state is, for example, a state in which a specific keyword is included in content of a conversation between the conversation device 20 and the occupant. As described above, the "specific keyword" may be a keyword related to a meal or hunger, may be a keyword related to a rest or fatigue, or may be both the meal or hunger and the rest or fatigue.

Figure 6:
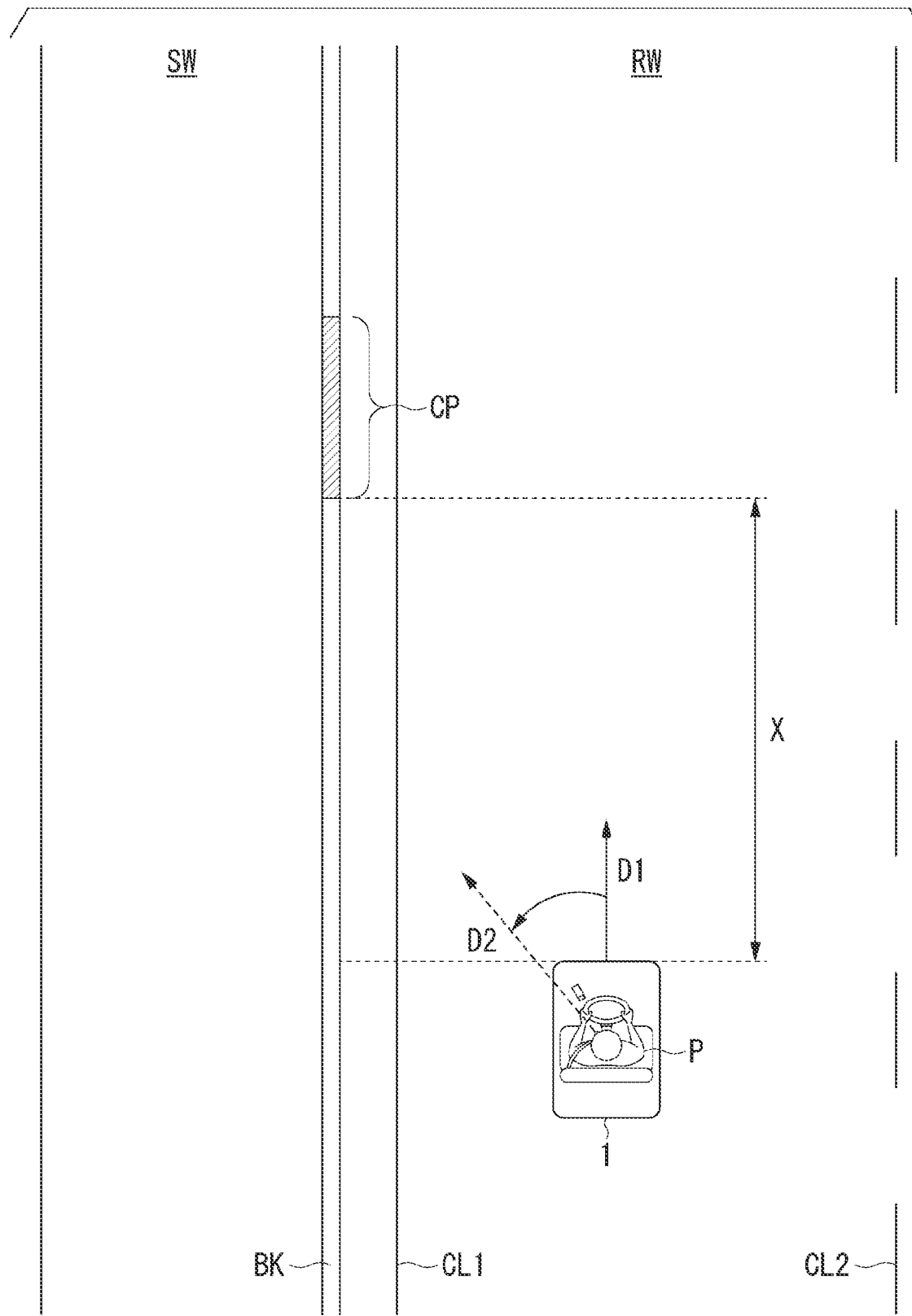
FIG. 6 is a diagram illustrating an example of a scenario in which a specific speed is controlled.

FIG. 6 is a diagram illustrating an example of a scenario in which a specific speed is controlled. In the drawing, X denotes a distance between the mobile object 1 and the contact portion CP. CL1 is a white line indicating a left end of the roadway RW and CL2 is a dashed line demarcating a lane in which there is the mobile object 1 and an opposing lane. The distance X is defined as, for example, a distance between a position of a frontmost side of the contact portion CP and a front end of the mobile object 1. However, the present invention is not limited thereto and any distance such as a distance between the middle of the contact portion CP and the center of the mobile object 1 may be defined. D2 denotes a direction of a visual line of an occupant. Specific speed control is performed when the distance X is equal to or less than a predetermined distance (for example, the contact portion CP is within a predetermined range from the mobile object 1) and a state in which an angle between a traveling direction D1 of the mobile object 1 and a direction D2 of a visual line of an occupant is the first angle or more continues for the first reference time or more.

In mode B, the controller 140 gradually switches the upper limit of the speed of the mobile object 1 from the first speed V1 to the second speed V2 when the mobile object 1 is moving on a roadway, the contact portion is recognized within a predetermined range from the mobile object 1, and a state of an occupant is the predetermined state (a further question may be performed for checking). Instead of this, when the foregoing conditions are satisfied in mode B, the controller 140 may make a suggestion using the conversation device 20 so that the speed is brought closer to the second speed V2 through a manual manipulation simply using the accelerator pedal AP or the brake pedal BP. For example, the controller 140 causes the conversation device 20 to output a vocal sound "Please reduce speed if you enter sidewalk." The definition of the predetermined state is similar to that of mode A.

Figure 7:
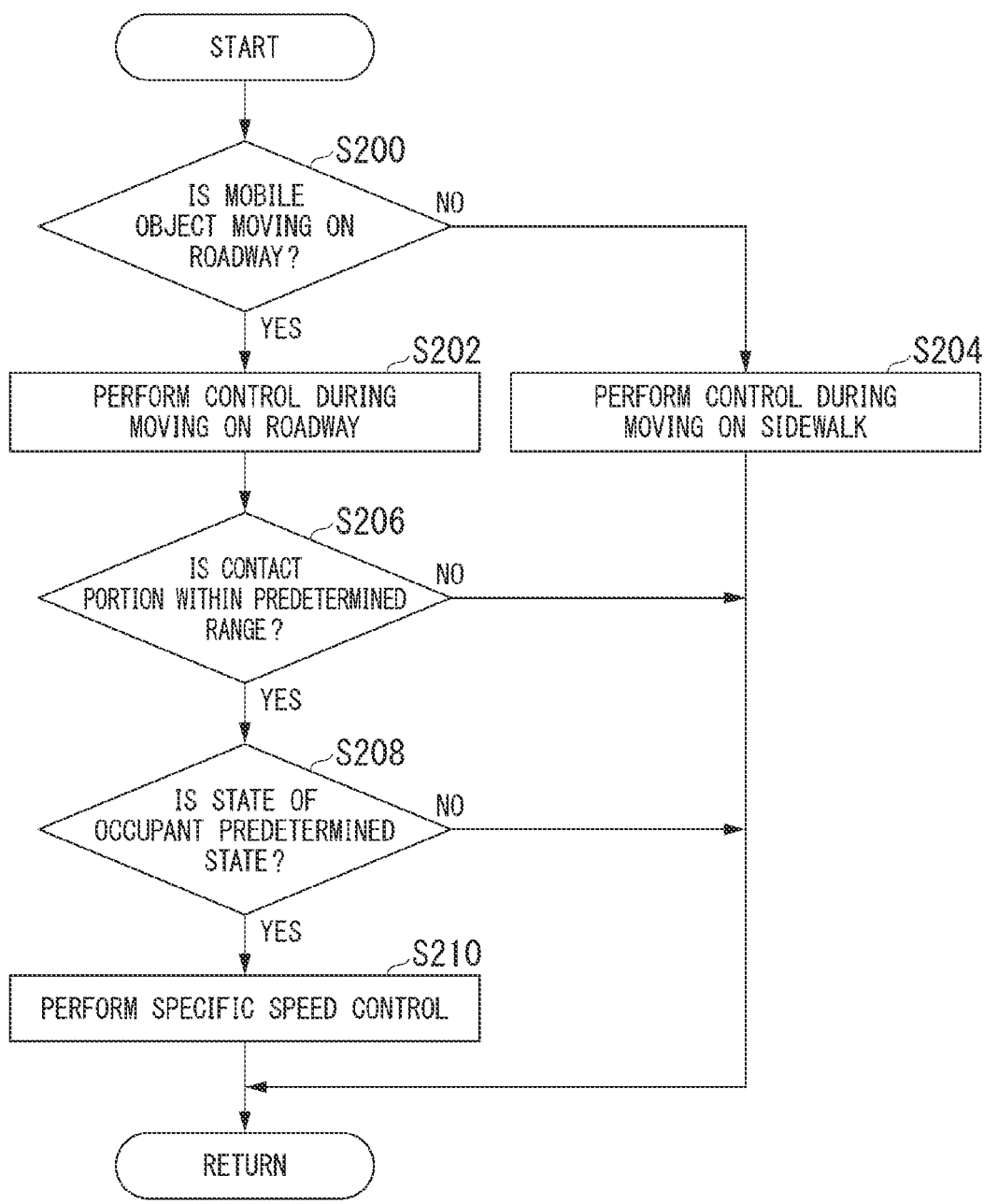
FIG. 7 is a flowchart illustrating an example of a flow of a process performed by the control device according to the embodiment.

FIG. 7 is a flowchart illustrating an example of a flow of a process performed by the control device 100 according to the embodiment. In the process of the flowchart, mode A is a premise. The process of the flowchart is performed repeatedly, for example, at predetermined time intervals.

First, the road type recognizer 120 determines whether the mobile object 1 is moving on a roadway (or is moving on a sidewalk) (step S200). When it is determined that the mobile object 1 is moving on the roadway, the controller 140 performs control of the case in which the mobile object 1 is moving on the roadway, as described above (step S202). Subsequently, based on a recognition result of the contact portion recognizer 130, the controller 140 determines whether the contact portion CP is within the predetermined range in the traveling direction of the mobile object 1 (step S206). When the controller 140 determines that the contact portion CP is within the predetermined range in the traveling direction of the mobile object 1, the controller 140 determines whether the state of the occupant is the predetermined state based on information supplied from the acquirer 110 (step S208). When the controller 140 determines that the state of the occupant is the predetermined state, the controller 140 performs the specific speed control (step S210).

When a negative determination result is obtained in step S206 or S208, the process of one routine of the flowchart ends. When it is determined in step S200 that the mobile object 1 is moving on the sidewalk, the controller 140 performs control of the case in which the mobile object 1 is moving on the sidewalk (step S204).

According to the above-described first embodiment, it is possible to appropriately control a mobile object capable of moving on both a roadway and a sidewalk at the time of entrance to a predetermined region from a roadway. The "predetermined state" is a state in which an intention of an occupant who desires to move on a sidewalk is estimated. Accordingly, when the occupant is in the predetermined state, a probability of the mobile object 1 entering a sidewalk when the occupant manipulates the steering wheel WH in the approaching contact portion CP is estimated to increase. Incidentally, there is a difference between the first speed V1 which is the speed of the upper limit or a target speed on a roadway and the second speed V2 which is the upper limit of the speed or a target speed on a sidewalk. Therefore, when the mobile object 1 moving at the first speed V1 abruptly enters a sidewalk, a scenario in which sudden deceleration has to be performed can occur. When turning to enter a sidewalk is started during movement at the first speed V1 which is a relatively high speed, there is concern of a large lateral acceleration occurring. That is, there is a possibility of deceleration being late after steering actually starts.

On the other hand, the control device 100 according to the embodiment can inhibit the foregoing sudden deceleration or sudden turning from occurring because of bringing of a speed of the mobile object closer to the second speed V2 when the mobile object 1 is moving on a roadway, the contact portion CP is recognized within the predetermined range in the traveling direction of the mobile object 1, and the state of the occupant is the predetermined state. As a result, it is possible to perform appropriate control at the time of entrance from a roadway to a sidewalk.

Second Embodiment

Hereinafter, a second embodiment will be described. The control device 100 of the second embodiment is different from that of the first embodiment in the function of the road type recognizer 120. The road type recognizer 120 according to the second embodiment recognizes whether the mobile object 1 is traveling on a roadway or a sidewalk, for example, in response to a manipulation of an occupant on a road type input switch (not illustrated) provided in the mobile object. The road type input switch is provided in, for example, a boss section or the like of the steering wheel WH. The road type input switch includes, for example, a mechanism which can be manipulated to upper and lower sides and maintains a manipulated position, indicates a roadway when the road type input switch is manipulated to the upper side, and indicates a sidewalk when the road type input switch is manipulated to the lower side. The road type input switch may be of a button or GUI switch type. When the road type input switch is manipulated in a state in which the control device 100 recognizes that the mobile object is traveling on a sidewalk, the recognition may be switched to recognition during traveling on a sidewalk. When the road type input switch is manipulated in a state in which the control device 100 is traveling on a roadway, the recognition may be switched to recognition during traveling on a roadway. In this configuration, since the function of automatically recognizing whether the mobile object 1 is traveling on a roadway or a sidewalk can be omitted, it is possible to reduce a processing load or cost. Here, since there is a possibility of an erroneous manipulation by an occupant, the external report device 50 preferably reports information to the outside in the second embodiment.

OTHERS

In the foregoing embodiments, the controller 140 may perform the control of only one of mode A and mode B. That is, the mobile object 1 may perform the speed assistance mode and may not perform the manual mode, or may perform the manual mode and may not perform the speed assistance mode. The controller 140 may perform the control of both mode A and mode B, but may perform the specific speed control only when one of mode A and mode B is performed. In any case, whether to perform the control of mode C may be arbitrarily determined.

The embodiments for carrying out the present invention have been described above, but the present invention is not limited to the embodiments. Various modifications and substitutions can be made within the scope of the present invention without departing from the gist of the present invention.

What is claimed is:

1. A mobile object control device comprising:
a storage device storing a program; and
a hardware processor,
wherein the hardware processor executes the program stored in the storage device to:
acquire a state of at least one occupant getting on a mobile object capable of moving on both a roadway and a predetermined region different from the roadway;
recognize whether the mobile object is moving on the roadway or the predetermined region;
recognize presence of a contact portion between the predetermined region and the roadway in a traveling direction of the mobile object, the contact portion being provided at a boundary between the roadway and the predetermined region and being for the mobile object to exit the roadway and enter the predetermined region for travel on the predetermined region or exit the predetermined region and enter the roadway for travel on the roadway;
control the speed of the mobile object at least partially;
limit a speed at which the mobile object is moving on the roadway to a first speed;
limit a speed at which the mobile object is moving on the predetermined region to a second speed slower than the first speed; and
bring a speed of the mobile object closer to the second speed when the mobile object is moving on the roadway, the contact portion is recognized within a predetermined range from the mobile object, and the state of the occupant is a predetermined state,
wherein the hardware processor executes the program stored in the storage device to:
determine whether a distance between the mobile object and the contact portion in the traveling direction of the mobile object is equal to or less than a predetermined distance;
based on a determination that the distance is equal to or less than the predetermined distance;
acquire a direction of a visual line of the occupant as a state of the occupant based on an image of the occupant captured by an internal camera mounted in the mobile object;
determine whether a state in which an angle between the traveling direction of the mobile object and the direction of the visual line of the occupant is a predetermined angle or more continues for a reference time or more;
based on a determination that the state in which the angle between the traveling direction of the mobile object and the direction of the visual line of the occupant is the predetermined angle or more continues for the reference time or more, bring the speed of the mobile object closer to the second speed prior to a time of entrance of the mobile object into the contact portion from the roadway.

2. The mobile object control device of claim 1,
wherein the hardware processor questions about an intention to enter the predetermined region using an interface device when the mobile object is moving on the roadway, the contact portion is recognized within the predetermined range from the mobile object, and the state of the occupant is the predetermined state, and a speed of the mobile object is brought closer to the second speed when a positive response is obtained.

3. The mobile object control device of claim 1,
wherein the predetermined state is a state in which the direction of the visual line of the occupant is unstable.

4. The mobile object control device of claim 1,
wherein the hardware processor acquires content of a conversation with the occupant spoken using an interface device, and
wherein the predetermined state is a state in which a specific keyword is included in the content of the conversation.

5. The mobile object control device of claim 4,
wherein the specific keyword is related to a meal or hunger.

6. The mobile object control device of claim 4,
wherein the specific keyword is related to a rest or fatigue.

7. The mobile object control device of claim 1,
wherein the hardware processor recognizes whether the mobile object is moving on the roadway or the predetermined region based on an output of an outside world detection device detecting an outside situation of the mobile object.

8. The mobile object control device of claim 1,
wherein the hardware processor recognizes whether the mobile object is moving on the roadway or the predetermined region based on a manipulation by the occupant on a switch provided inside the mobile object.

9. The mobile object control device of claim 1,
wherein, when the hardware processor recognizes that the mobile object is moving on the predetermined region, the hardware processor causes an external report device to report the mobile object which is moving on the predetermined region to the outside of the mobile object.

10. The mobile object control device of claim 1,
wherein the predetermined region is a region which a person can walk, and the predetermined region includes a sidewalk, a roadside strip, a bicycle lane, and a public open space.

11. The mobile object control device of claim 1,
wherein the recognizing of whether the mobile object is moving on the roadway or the predetermined region comprises:
analyzing an image captured by a camera provided in the mobile object;
recognizing that the mobile object is moving on the roadway when a width of a region equivalent to a front face of the mobile object in the image is equal to or larger than a predetermined value or is larger than the predetermined value; and
recognizing that the mobile object is moving on the predetermined region when the width of the region equivalent to the front face of the mobile object in the image is equal to or smaller than a predetermined value or is smaller than the predetermined value.

12. The mobile object control device of claim 1,
wherein the recognizing of whether the mobile object is moving on the roadway or the predetermined region comprises:
classifying pixels of an image captured by a camera provided in the mobile object into classes and performing labeling;
recognizing that the mobile object is moving on the roadway when a number of pixels labeled as a roadway in a region equivalent to a front face of the mobile object is equal to or larger than a predetermined value or is larger than the predetermined value; and
recognizing that the mobile object is moving on the predetermined region when the number of pixels labeled as a predetermined region in the region equivalent to the front face of the mobile object is equal to or smaller than a predetermined value or is smaller than the predetermined value.

13. The mobile object control device of claim 1,
wherein an operator for switching driving controls of the mobile object is provided in the mobile object, and
the driving controls include a first control in which an acceleration or deceleration speed control is automatically performed, a second control in which a steering manipulation and the acceleration or deceleration speed manipulation are performed by the occupant, and a third control in which manipulation control and the acceleration or deceleration speed control are automatically performed.

14. A mobile object control method using a computer controlling a mobile object on which at least one occupant gets and which is capable of moving both on a roadway and a predetermined region different from the roadway, the mobile object control method comprising:
acquiring a state of the occupant;
recognizing whether the mobile object is moving on the roadway or the predetermined region;
recognizing presence of a contact portion between the predetermined region and the roadway in a traveling direction of the mobile object, the contact portion being provided at a boundary between the roadway and the predetermined region and being for the mobile object to exit the roadway and enter the predetermined region for travel on the predetermined region or exit the predetermined region and enter the roadway for travel on the roadway;
controlling the speed of the mobile object at least partially;
limiting a speed at which the mobile object is moving on the roadway to a first speed;
limiting a speed at which the mobile object is moving on the predetermined region to a second speed slower than the first speed; and
bringing a speed of the mobile object closer to the second speed when the mobile object is moving on the roadway, the contact portion is recognized within a predetermined range from the mobile object, and the state of the occupant is a predetermined state,
wherein the mobile object control method further comprises:
determining whether a distance between the mobile object and the contact portion in the traveling direction of the mobile object is equal to or less than a predetermined distance;
based on a determination that the distance is equal to or less than the predetermined distance;
acquiring a direction of a visual line of the occupant as a state of the occupant based on an image of the occupant captured by an internal camera mounted in the mobile object;
determining whether a state in which an angle between the traveling direction of the mobile object and the direction of the visual line of the occupant is a predetermined angle or more continues for a reference time or more; and based on a determination that the state in which the angle between the traveling direction of the mobile object and the direction of the visual line of the occupant is the predetermined angle or more continues for the reference time or more, bringing the speed of the mobile object closer to the second speed prior to a time of entrance of the mobile object into the contact portion from the roadway.

* * * * *